Oct. 7, 1958   R. R. GOINS ET AL   2,855,268
DETECTION OF THE PRESENCE OF SOLIDS IN FLUID MEDIA
Filed May 28, 1954
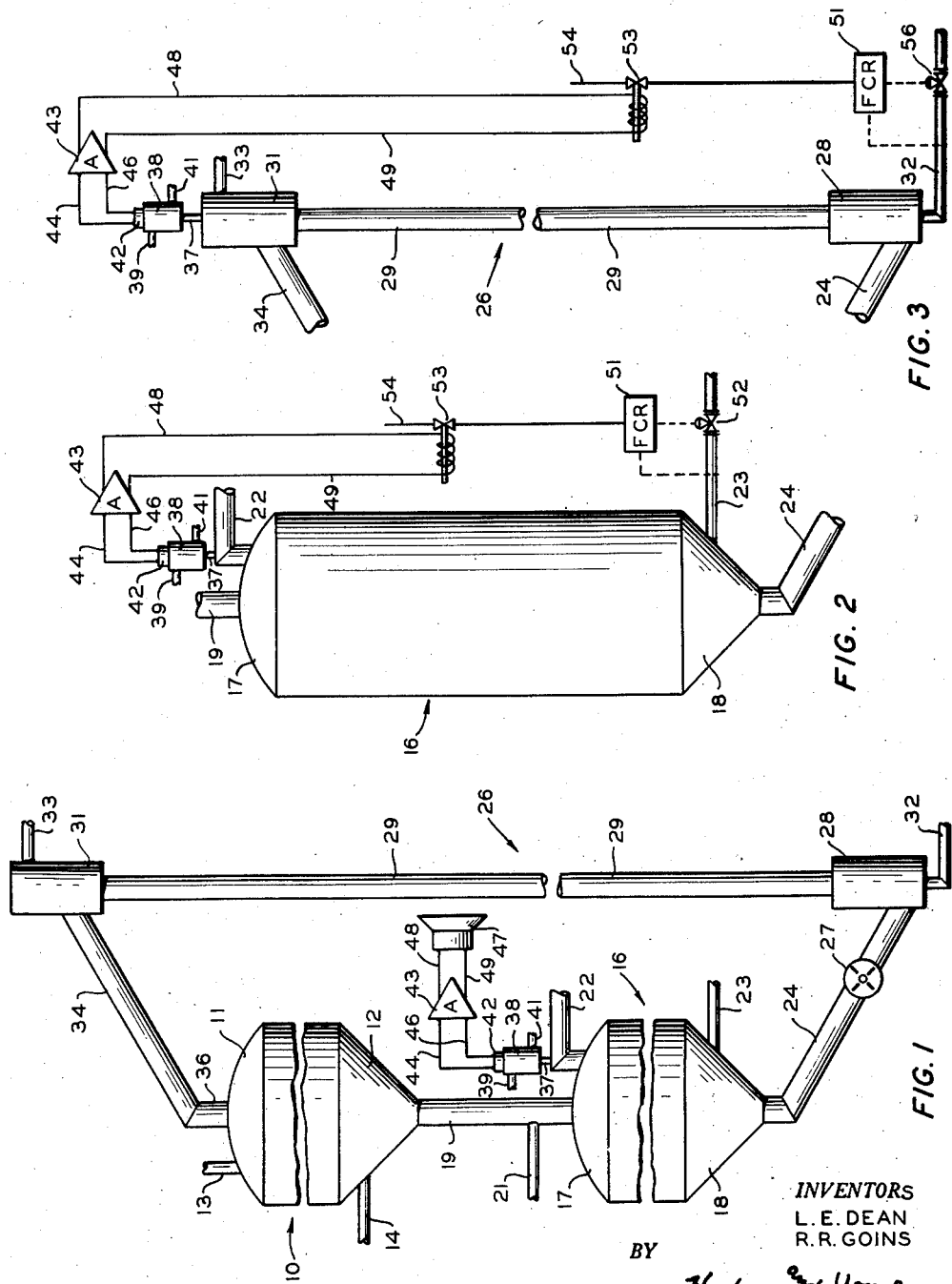
INVENTORS
L. E. DEAN
R. R. GOINS
BY
Hudson and Young
ATTORNEYS United States Patent Office 2,855,268
Patented Oct. 7, 1958

2,855,268

DETECTION OF THE PRESENCE OF SOLIDS IN FLUID MEDIA

Robert R. Goins and Lloyd E. Dean, Bartlesville, Okla., assignors to Phillips Petroleum Company, a corporation of Delaware Application May 28, 1954, Serial No. 433,237

11 Claims. (Cl. 23—1)

This invention relates to the detection of the presence of solids in fluid media. In one of its more specific aspects it relates to means for indicating the presence of solids in fluid media. In another of its more specific aspects, it relates to hydrocarbon conversion systems. In another of its more specific aspects it relates to means for indicating the presence of solid material in the gaseous effluent removed from the reactor of pebble heater apparatus. In still another of its more specific aspects, it relates to a method for controlling hydrocarbon conversion processes. In yet another of its more specific aspects, it relates to a method for controlling the flow of solids in pneumatic conveyor systems.

In the petroleum and chemical industries, many processes are carried out by contacting fluids with solid materials which may be catalytic or noncatalytic. The solid contact material utilized may be confined to a fixed bed, or it may be disposed in a moving non-fluidized bed or in a moving fluidized bed. In the conduct of such processes, it becomes important to be able to control the movement of solid material in relation to its transfer medium and with respect to the products of reaction.

Hydrocarbon conversion processes are often carried out in pebble heater apparatus, and the present invention will be described specificaly in relation to such apparatus. Conventional pebble heater apparatus usually comprises a series of at least two chambers positioned substantially in vertical alignment with one another. The upper and lower chambers are sometimes referred to, respectively, as the pebble heating chamber and the gas reaction chamber. Solid heat exchange material is introduced into the upper portion of the heating chamber where it forms a moving bed of material which flows downwardly through the chamber in direct heat exchange with hot gaseous heat exchange material. The hot gas in contacting the mass of solid heat exchange material transfers heat thereto, the effluent gas being removed thereafter from the upper portion of the heating chamber. Hot solid heat exchange material is then passed downwardly from the heating chamber through a pebble throat into the gas reaction chamber where it is contacted in countercurrent flow with gaseous reactant material in a second direct heat exchange relation. Effluent gas from the gas reaction chamber is withdrawn from the top portion thereof through an effluent outlet conduit while relatively cool solid heat exchange material gravitates from the lower portion of that chamber. The solid heat exchange material is then elevated to the top portion of the pebble heating chamber.

Solid heat exchange material which is conventionally used in pebble heater apparatus is generally called "pebbles." For a more detailed description of the pebbles which can be utilized herein, reference may be had to U. S. Patent No. 2,536,436.

One of the difficulties encountered during the operation of pebble heater apparatus arises from the fact that pebbles may be carried out of the reaction chamber through the effluent outlet conduit with the effluent gas. By being carried out of the reaction chamber in this manner, the pebbles are damaged by thermal shock on being passed into the pebble heater quench system. The incidence of pebble carry-over is an indication of the existence of unstable and unsatisfactory operating conditions within the pebble heater reaction chamber. Such conditions may be the result of the deposition of carbonaceous materials in the upper portion of the reaction chamber and around the gaseous effluent outlet conduit from that chamber. As a result of the carbon lay-down, the gas velocity through the upper portion of the reaction chamber sometimes reaches such proportions that pebbles are blown out of the chamber through the effluent outlet conduit. Or still again, the carry-over of pebbles is sometimes caused by a too high hydrocarbon feed rate or by the inadvertent introduction of a fluid such as water into the reaction chamber. As a result, the effluent gas leaves the reaction chamber at a greatly increased velocity carrying along pebbles from the pebble bed. In accordance with this invention, means are provided for immediately detecting when pebbles are being carried out of the reaction chamber so that steps may be taken to correct the unstable conditions of operation.

In the operation of pebble heater apparatus, elevators of the gas lift type are conventionally used to raise the pebbles from the lower portion of the reaction chamber to the upper portion of the heating chamber. The upper portion of a gas lift usually comprises a disengaging chamber where the pebbles are separated from the lift gas. During the operation of gas lifts, it often happens that pebbles strike the top of the disengaging chamber, resulting in damage to the pebbles from mechanical shock and abrasion. It becomes important, therefore, to control the supply of lift gas to the gas lift in such a manner that pebbles do not strike the upper portion of the disengaging chamber. In accordance with the present invention, means are provided for detecting the impact of pebbles against the upper portion of the disengaging chamber of a gas lift and for controlling the supply of lift gas so that the height to which the pebbles rise in the disengaging chamber is decreased.

The following objects of the invention will be attained by the various aspects of the invention.

It is an object of this invention to provide means for detecting the presence of solid material in fluid media.

Another object of the invention is to provide an improved hydrocarbon conversion system.

Still another object of the invention is to provide means for indicating the presence of solid material in the gaseous effluent from the reactor of pebble heater apparatus.

Yet another object of the invention is to provide a method for controlling hydrocarbon conversion processes carried out in pebble heater apparatus.

A further object of the invention is to provide means for controlling the flow of solid materials in pneumatic elevators.

Still a further object is to provide a method for controlling the supply of lift gas to a gas lift type elevator.

Other and further objects and advantages will become apparent to those skilled in the art upon reference to the accompanying disclosure.

Broadly speaking, the present invention resides in a means and method for detecting the presence of solids in fluids whereby the solids are caused to strike a solid conductor such as steel or iron. The vibrations set up in the conductor are converted to electrical pulses which are amplified and then utilized to activate a warning device such as a loud speaker or to control process variables as desired. In a preferred modification, the invention is employed in conjunction with pebble heater apparatus to detect the presence of solids in the effluent gas from the reaction chamber. In another preferred modification, the invention is utilized in conjunction with the gas lift of pebble heater apparatus in order to control the supply of lift gas to the gas lift elevator.

A more complete understanding of the invention may be obtained by reference to the following description and the drawing, in which:

Figure 1 is a diagrammatic elevation of pebble heater apparatus illustrating the present invention;

Figure 2 is a diagrammatic elevation of the reactor of Figure 1 illustrating use of the invention in process control; and Figure 3 is a diagrammatic elevation of a pebble heater gas lift which utilizes the present invention.

Referring to Figure 1 of the drawing, pebble heater apparatus is illustrated which comprises an upright elongated shell 10 closed at its upper and lower ends by closure members 11 and 12, respectively. Gaseous effluent outlet conduit 13 extends from the upper portion of the pebble heating chamber formed within shell 10 while heating material inlet means 14 is provided in the lower portion of that chamber. Upright elongated shell 16, closed at its upper and lower ends by closure members 17 and 18, respectively, is disposed below shell 10. Pebble conduit means, such as conduit 19, or a plurality of such conduits, extending between closure member 12 of shell 10 and closure member 17 of shell 16, connects the pebble heating chamber with the gas reaction chamber formed within shell 16. Line 21 connected to conduit 19 provides means for introducing an inert gas, such as steam, into that conduit. Gaseous effluent outlet conduit 22 is disposed in the upper portion of the gas reaction chamber while reactant material inlet conduit 23 is provided in the lower portion of that chamber.

Pebble outlet conduit 24 extends downwardly from closure member 18 to the lower end of gas lift elevator 26. The pebble outlet conduit is provided with a pebble feeder 27 which may be one of the conventional pebble feeders such as a star valve, a gate valve, a rotatable table feeder, or the like. It is also within the scope of the invention to omit pebble feeder 27 and provide for the control of pebble flow by a means associated with elevator 26 as disclosed by one of us in copending application, Serial No. 309,252, filed September 12, 1952. Gas lift 26 comprises engaging pot 28 having pebble outlet conduit 24 connected thereto, gas lift conduit 29, and disengaging chamber 31. Line 32 provides means for introducing lift gas into the lower end of the gas lift while line 33 is for removal of gaseous effluent. Pebble conduit 34 extends between disengaging chamber 31 and pebble inlet 36 to the pebble heating chamber.

A rod or wire 37 made of a conducting material such as iron or steel is attached as by welding to the upper surface of effluent outlet conduit 22. Rod 37 is preferably attached to the elbow of the effluent outlet conduit as illustrated, but other arrangements of apparatus may be employed which come within the contemplation of the invention. Accordingly, when using a horizontal conduit, a rod or plurality of rods may be inserted into the conduit. Still again, instead of utilizing rods, it may be advantageous in some instances to use a plate or plates as the sound conducting member. The upper end of rod 37 is affixed as by welding to a cooling chamber 38 also made of a conducting material such as iron or steel. Cooling chamber 38, which may be conveniently fabricated from a length of steel pipe closed at both ends by steel plates, is provided with coolant inlet and outlet lines 39 and 41, respectively. A contact microphone 42 mounted on the upper end of cooling chamber 38 is connected to amplifier-relay 43 by means of leads 44 and 46. The output signal from amplifier-relay 43 is fed through leads 48 and 49 to a warning device such as loud speaker 47 which may be advantageously located in a control room. It is to be understood that other means for converting electrical pulses into a warning signal, e. g., bells or lights, may be utilized without departing from the scope of the invention.

Referring to Figure 2 of the drawing, means are illustrated for controlling hydrocarbon conversion processes carried out in the pebble reaction chamber of Figure 1. Identical numerals have been utilized to designate elements which have been previously described in conjunction with Figure 1. A flow controller-recorder 51, which is provided with a pneumatic reset mechanism, is operatively connected to an orifice contained in reactant material inlet conduit 23 and to a valve 52 contained in the same conduit. The signal produced by amplifier-relay 43 is fed to the solenoid of a normally closed solenoid valve 53 through leads 48 and 49. Solenoid valve 53 is contained in instrument air line 54 which is connected to the pneumatic reset mechanism of flow controller-recorder 51. The pneumatic reset mechanism is provided with a small bleed to prevent entrapping air under pressure when solenoid valve 53 is closed.

Referring to Figure 3 of the drawing, the present invention is illustrated as it is utilized in conjunction with a gas lift type elevator. Identical numerals are used to indicate parts of the apparatus already described in relation to Figures 2 and 3. Sounding rod 37 is affixed to the upper end of disengaging chamber 31 of the gas lift. It is to be understood, however, that rod 37 may be otherwise located without departing from the scope of the invention. For example, a rod or series of rods may be disposed horizontally within the disengaging chamber at the point of the desired maximum elevation of pebbles. In this preferred modification of the invention, flow controller-recorder 51 is operatively connected to valve 56 contained in lift gas line 32. A warning device, similar to that described in conjunction with Figure 1, may be used with the apparatus of Figures 2 and 3 so as to provide a visible or audible signal whenever electrical pulses are fed to amplifier-relay 43. When so used, the warning device is connected across the leads connecting the amplifier-relay to the solenoid of the solenoid valve.

In the operation of the apparatus of Figure 1, pebbles are heated in the pebble heating chamber formed within shell 10 by contact with hot gaseous heat exchange material. The hot gaseous heat exchange material may result from the combustion of fuel outside of the heating chamber or in the lower portion of that chamber in a combustion zone separated from the pebble mass, or by burning a fuel in direct contact with the pebble mass within the chamber. Pebbles introduced into the pebble heating chamber through pebble inlet 36 form a contiguous gravitating mass which extends downwardly through shell 10, pebble conduit 19, shell 16, and pebble outlet conduit 24 to pebble feeder 27. The pebbles are heated in the pebble heating chamber to temperatures in the approximate range of 1200° F. to 3200° F., depending upon the particular reaction being carried out within the pebble heater apparatus. The hot pebbles are gravitated through conduit 19 into the upper portion of the gas reaction chamber formed within shell 16. An inert sealing gas, such as steam, is supplied to conduit 19 through line 21 in order to prevent passage of combustion gases downwardly from the heating chamber and reaction products upwardly from the reaction chamber. Usually the temperature of the pebbles entering the reaction chamber is about 100° F. to about 500° F. below the average temperature of the combustion gases within the heating chamber. Reactant materials introduced into the reaction chamber through inlet conduit 23 contact the gravitating mass of hot pebbles and undergo reaction. The effluent gas is withdrawn through gaseous effluent outlet conduit 22 and thereafter passed to quenching means and a purification system, not shown. The cooled pebbles flow from the bottom of the reaction chamber through pebble outlet conduit 24 and pass therethrough into engaging pot 28 at a rate dependent upon the operation of the pebble feeder means employed. In the engaging pot the pebbles contact the stream of lift gas, such as air, which is introduced into the lower end thereof through lift gas inlet line 32. The pebbles are raised by the air stream through gas lift conduit 29 to the top of the gas lift where the pebbles fall out of the air stream in disengaging chamber 31. The pebbles then flow through pebble conduit 34 to pebble inlet 36 through which the pebbles enter the pebble heating chamber. The air is withdrawn from disengaging chamber 31 through gaseous effluent conduit 33.

During the operation of pebble heater apparatus as described above, pebbles may at times leave the reaction chamber with the effluent gas through gaseous effluent outlet conduit 22. The carry-over of pebbles in this manner is, in general, caused by an increased velocity of the effluent gas resulting from unstable and unsatisfactory operating conditions existing within the pebble heater reaction chamber. For example, such unsatisfactory operating conditions may result from a build-up of carbon in the upper portion of the reaction chamber and around the gaseous effluent outlet conduit, or it may be caused by a sudden increase in the hydrocarbon feed rate or by the inadvertent introduction of a fluid such as water into the reaction chamber. The pebbles on being carried out of the reaction chamber strike the upper portion of the elbow of gaseous effluent outlet conduit 22 setting up mechanical vibrations which are transmitted through rod 37 and cooling chamber 38 to contact microphone 42. A coolant such as water is continuously circulated through cooling chamber 38 by means of inlet line 39 and outlet line 41 so as to protect contact microphone 42 from excessively high temperatures which might result from heat transmitted through rod 37. Contact microphone 42 converts the vibration set up in rod 37 and the cooling chamber 38 into electrical pulses which are fed to amplifier-relay 43 through leads 44 and 46. The electrical pulses are amplified by amplifier-relay 43, and the signal applied to loud speaker 47 through leads 48 and 49. Louid speaker 47 is thereby activated, serving as a warning that pebbles are being carried out of the reaction chamber and that unstable conditions exist therein.

In a preferred modification of the invention as illustrated in Figure 2, means are provided for controlling the hydrocarbon feed charged to the reactor so that unstable conditions existing therein as indicated by pebble carry-over may be automatically corrected. Flow controller-recorder 51 is initially given the flow rate setting at which it is desired to supply hydrocarbon feed to the reactor. Whenever pebbles are carried out of the reaction chamber, electrical pulses are fed to amplifier-relay 43 which then actuates solenoid valve 53. Since solenoid valve 53 is normally closed, the energizing of its solenoid results in the valve being opened so that instrument air at a constant pressure, e. g., 15 pounds p. s. i., may pass through line 54 to the pneumatic reset mechanism of flow controller-recorder 51. Responsive to this pneumatic signal, the pneumatic reset mechanism resets the initial setting of the flow controller-recorder, decreasing this setting by a unit amount per unit of time during which air is supplied thereto. Flow controller-recorder 51 actuates valve 52 so that hydrocarbon feed is charged to the reaction chamber through inlet conduit 23 at a rate corresponding to its decreased flow rate setting. By cutting back on the supply of hydrocarbon feed to the reaction chamber, the volume of effluent gas leaving the pebble bed and concomitantly the velocity of that gas leaving the reaction chamber is decreased with the result that the tendency of pebbles to be blown out of that chamber is lessened. Solenoid valve 53 remains open so long as amplifier-relay 43 receives electrical pulses, indicating that pebbles are leaving the reaction chamber with the effluent gas. When the amplifier-relay no longer receives electrical pulses, indicating the termination of pebble carry-over, the solenoid valve closes thereby terminating the supply of instrument air to the pneumatic reset mechanism of flow controller recorder 51. By operating in this manner, the rate of flow of hydrocarbon feed to the reaction chamber is automatically decreased until pebbles are no longer carried out of that chamber with the effluent gas, thereby indicating that stable conditions have been restored within the reaction chamber. After the restoration of stable operating conditions, the initial flow rate setting is restored to the flow controller-recorder. Hydrocarbon feed is now supplied to the reaction chamber at a rate corresponding to the initial flow rate setting.

In another preferred modification of the invention as illustrated in Figure 3, means are provided for controlling the supply of lift gas to the gas lift elevator. In operating gas lift 26, a lift gas such as air is supplied to the gas lift through line 32 at such a rate that pebbles are raised through conduit 29 to disengaging chamber 31. In the disengaging chamber the pebbles fall out of the stream of lift gas and thereafter leave that chamber through pebble conduit 34. For efficient and satisfactory operation of the gas lift, it is necessary that the pebbles fall out of the gas stream before impinging against the top of the disengaging chamber. If the pebbles are allowed to strike the top of the disengaging chamber, the result is a high rate of pebble breakage. Flow controller-recorder 51 is given an initial flow rate setting at which it is desired to supply lift gas to the gas lift through inlet line 32. In accordance with the initial flow rate setting, lift gas is supplied to the gas lift at such a rate that for the particular operating conditions, i. e., temperature of the lift gas and amount of pebbles entering the gas lift, pebbles fall out of the gas stream before striking the top of the disengaging chamber. If the operating conditions become unstable causing pebbles to strike the top of disengaging chamber 31, vibrations are set up in sounding rod 37 and cooling chamber 38. The vibrations are converted to electrical pulses by contact microphone 42 and thereafter amplified by amplifier-relay 43 which then actuates solenoid valve 53. Since solenoid valve 53 is normally closed, the energizing of its solenoid results in the valve being opened, thereby permitting instrument air to pass to the pneumatic reset mechanism of flow controller-recorder 51 through line 54. Responsive to this pneumatic signal, the pneumatic reset mechanism resets the initial setting of the flow controller-recorder, decreasing this setting by a unit amount per unit of time during which instrument air is supplied thereto. Flow controller-recorder 51 actuates valve 56 so that lift gas is introduced into the gas lift through inlet line 32 at a rate corresponding to the decreased flow rate setting. By cutting back on the supply of lift gas to the gas lift, the height to which pebbles rise in disengaging chamber 38 is decreased. Solenoid valve 53 remains opened so long as electrical pulses are received by amplifier-relay 43 indicating that pebbles are impinging against the top of the disengaging chamber. When the amplifier-relay stops receiving electrical pulses, indicating that pebbles are no longer striking the top of the disengaging chamber, the solenoid valve closes, thereby terminating the supply of instrument air to the pneumatic reset mechanism of the flow controller-recorder. By operating in this manner, the rate of flow of lift gas to the gas lift is automatically decreased so that the pebbles are raised in the disengaging chamber to such a height that they fall out of the lift gas stream before impinging against the top of the disengaging chamber. After the restoration of stable operating conditions in the gas lift as indicated by the termination of pebble impingement, the initial flow rate setting is restored to the flow controller-recorder. Lift gas is now supplied to the gas lift at a rate corresponding to the initial flow rate setting.

A more complete understanding of the invention may be obtained by reference to the following examples which are not intended, however, to be unduly limitative of the invention.

Example I

A gaseous hydrocarbon feed containing about 60 mol percent ethane and 6.6 mol percent propane is supplied to the reactor of a pebble heater system similar to that illustrated in Figure 2. Flow controller-recorder 51 is set to supply the feed at a rate of 40,000 S. C. F. H. Pebbles are circulated through the system at the rate of 36,300 lbs./hr. Pebbles enter the reactor at a temperature of about 1850° F. The hydrocarbon feed contacts the hot pebbles in counter current flow and is cracked to an ethane conversion of 86.3 percent and a propane conversion of 94.0%. The pebbles leave the reactor at a temperature of about 955° F. Under these conditions pebbles are not normally carried into conduit 22 by the gaseous effluent. From time to time, however, some pebbles are carried into conduit 22, where they strike against the wall of the conduit causing an electrical signal to be transmitted by microphone 42 to amplifier-relay 43, which, in turn, actuates the pneumatic reset mechanism of flow controller 51 via solenoid valve 53, thereby reducing the flow rate of the hydrocarbon feed to 38,000 S. C. F. H. This reduction in flow rate reduces the effluent gas velocity sufficiently to stop the carry-over of pebbles into conduit 22, and hence microphone 42 no longer transmits a signal to amplifier-relay 43. Solenoid valve 53 then closes, permitting the set point of flow controller 51 to return to its normal position, and the feed rate returns to the original value of 40,000 S. C. F. H. until such time as pebbles may again be carried over into conduit 22.

Example II

The pebble heater system of Figure 1 is operated at the conditions described in Example 1. When pebble carry-over occurs an audible signal is produced by loud speaker 47, whereupon the operator manually readjusts the feed flow rate to a lower value, for example, by resetting the control index of the flow controller (not shown in Figure 1, but corresponding to flow controller 51 of Figure 2) from 40,000 S. C. F. H. to 38,000 S. C. F. H. or to such other value as will result in stopping the audible signal from speaker 47.

Example III

The pebble heater elevator system of Figure 3 is operated so as to circulate 40,000 pounds of pebbles per hour. Air, heated by direct admixture with hot combustion gas from a burner, not shown, is admitted through line 32 and valve 56 at a rate of 100,000 S. C. F. H., at a temperature of 875° F. and a pressure of 1.2 p. s. i. g. Under these conditions the pebbles normally rise to a height of 4 to 6 feet within disengaging chamber 31, and none strike the top of that chamber. A temporary upset in air flow rate, air temperature or other conditions causing pebbles to strike the top of chamber 31 causes flow controller 51 to be reset in the same manner as described in Example I, to reduce the flow of air through valve 56 and line 32 to a rate of 98,000 S. C. F. H., whereupon pebbles no longer rise to the top of chamber 31. After pebbles have stopped striking against the top of chamber 31 so that there is no longer a signal received from microphone 42, the set point of controller 51 returns to its original position and normal operation is resumed at an air flow rate of 100,000 S. C. F. H.

As has been previously mentioned, means for producing an audible signal as shown in Figure 1 can be used in conjunction with the automatic control systems of Figure 2 or Figure 3, thereby warning the operator when these systems are functioning. Thus, if the audible signal is heard frequently or continuously the operator can reset the control index of controller 51 to a lower value, or take other appropriate steps to restore normal operation.

It will be apparent that in accordance with the present invention, an efficient and practical means is provided for detecting the presence of solids in fluid media. It will be further evident that by operating in the described manner, it is possible to obtain an early indication of any unstable and unsatisfactory operating conditions which may exist so that immediate steps may be taken to correct such conditions. While the present invention has been illustrated and described with relation to pebble heater apparatus, it is to be understood that the invention is applicable to any installation which involves at some point in its operation the movement of solid materials.

As will be evident to those skilled in the art, various modifications of this invention may be made or followed in the light of the foregoing disclosure and description without departing from the spirit or scope of the disclosure.

We claim:

1. Apparatus for detecting the presence of solids in fluids flowing through a conduit which comprises, in combination, a conduit means comprising an elbow; at least one sounding rod attached to said elbow; a cooling chamber provided with coolant inlet and outlet means and having one of its ends in contact with said sounding rod; means operatively connected to the other end of said cooling chamber for converting mechanical vibrations into electrical pulses; means for amplifying electrical pulses; means connecting said means for converting mechanical vibrations into electrical pulses to said amplifying means; means for converting electrical pulses into a warning signal; and means connecting said last mentioned means to said amplifying means.

2. Apparatus for detecting the presence of solids in fluids flowing through a conduit which comprises, in combination a conduit comprising an elbow; at least one sounding rod attached to said elbow; a cooling chamber provided with coolant inlet and outlet lines and having one of its ends in contact with said sounding rod; a contact microphone operatively connected to the other end of said cooling chamber; an amplifier; means connecting said contact microphone to said amplifier; a loud speaker; and means connecting said amplifier to said loud speaker.

3. Impoved pebble heater apparatus which comprises, in combination, a first upright elongated closed shell; pebble inlet means in the upper portion of said first shell; first gaseous effluent outlet means in the upper portion of said first shell; gaseous material inlet means in the lower portion of said first shell; a second upright elongated closed shell positioned below said first shell; pebble conduit means connecting the lower end portion of said first shell with the upper end portion of said second shell; reactant material inlet means in the lower portion of said second shell; second gaseous effluent outlet means in the upper portion of said second shell; means operatively connected to said second effluent outlet means for converting mechanical vibrations into electrical pulses; means for converting electrical pulses into a warning signal, said means being connected to said means for converting mechanical vibrations into electrical pulses; pebble outlet means in the lower portion of said second shell; and pebble elevating means connecting said pebble outlet means to said pebble inlet means.

4. The apparatus of claim 3 wherein said means for converting electrical energy into a warning signal is a loud speaker.

5. The apparatus of claim 4 wherein means are provided for controlling the flow of reactant material through said reactant material inlet means, said flow control means being operatively connected to said means for converting mechanical vibrations into electrical pulses.

6. The apparatus of claim 3 wherein said pebble elevating means comprises a substantially upright gas lift conduit; pebble engaging means in the lower end of said gas lift conduit, said engaging means being connected to said pebble outlet means; pebble disengaging means in the upper end of said gas lift conduit, said disengaging means being connected to said pebble inlet means; lift gas inlet means connected to the lower end of said pebble engaging means; means for controlling the flow of lift gas through said lift gas inlet means; gaseous effluent outlet means in the upper portion of said pebble disengaging means; and means for detecting impingement of solid material against the upper portion of said pebble disengaging means, said detecting means being operatively connected to said flow control means.

7. Improved pebble heater apparatus which comprises, in combination, a first upright elongated closed shell; pebble inlet means in the upper portion of said first shell; first gaseous effluent outlet means in the upper portion of said first shell; gaseous material inlet means in the lower portion of said first shell; a second upright elongated closed shell positioned below said first shell; pebble conduit means connecting the lower end portion of said first shell with the upper end portion of said second shell; reactant material inlet means in the lower portion of said second shell; means for controlling the flow of reactant material through said reactant material inlet means; second gaseous effluent outlet means in the upper portion of said second shell; means for detecting the presence of solid material in gaseous effluent passing through said second gaseous effluent outlet means, said detecting means being operatively connected to said flow control means; pebble outlet means in the lower portion of said second shell; and pebble elevating means connecting said pebble outlet means to said pebble inlet means.

8. Improved pebble heater apparatus which comprises, in combination, a first upright elongated closed shell; pebble inlet means in the upper portion of said first shell; first gaseous effluent outlet means in the upper portion of said first shell; gaseous material inlet means in the lower portion of said shell; a second upright elongated closed shell positioned below said first shell; pebble conduit means connecting the lower end portion of said first shell with the upper end portion of said second shell; reactant material inlet means in the lower portion of said second shell; second gaseous effluent outlet means in the upper portion of said second shell; conducting means operatively connected to said second gaseous effluent outlet means; means operatively connected to said conducting means for converting mechanical vibrations into electrical pulses; means for amplifying electrical pulses; means connecting said means for converting mechanical vibrations into electrical pulses to said amplifying means; means for converting electrical pulses into sound; means connecting said last mentioned means to said amplifying means; pebble outlet means in the lower portion of said second shell; and pebble elevating means connecting said pebble outlet means to said pebble inlet means.

9. Improved pebble heater apparatus which comprises, in combination, a first upright elongated closed shell; pebble inlet means in the upper portion of said first shell; gaseous effluent outlet means in the upper portion of said first shell; gaseous material inlet means in the lower portion of said shell; a second upright elongated closed shell positioned below said first shell; pebble conduit means connecting the lower end portion of said first shell to the upper end portion of said second shell; reactant material inlet means in the lower portion of said second shell; gaseous effluent outlet means in the upper portion of said second shell; pebble outlet means in the lower portion of said second shell; and pebble elevating means comprising a substantially upright gas lift conduit, pebble engaging means in the lower end of said gas lift conduit, said engaging means being connected to said pebble outlet means, pebble disengaging means in the upper end of said gas lift conduit, said disengaging means being connected to said pebble inlet means, lift gas inlet means connected to the lower end of said pebble engaging means, gaseous effluent outlet means in the upper portion of said pebble disengaging means, means operatively connected to the upper portion of said disengaging means for converting mechanical vibrations into electric pulses, and means for controlling the flow of lift gas through said lift gas inlet means, said flow control means being operatively connected to said means for converting mechanical vibrations into electrical pulses.

10. In an improved method of operating pebble heater apparatus wherein a uniform contiguous mass of pebbles is heated in a pebble heating zone to a temperature in the range of about 1200° F. to 3200° F., the heated pebbles are gravitated from the lower portion of said pebble heating zone into the upper portion of a reaction zone where they are contacted with reactant material, and gaseous effluent is removed from the upper portion of said reaction zone, the improvement which comprises detecting the presence of pebbles contained in the gaseous effluent removed from said reaction zone; and decreasing the supply of reactant material to said reaction zone until said pebbles are no longer present in said gaseous effluent.

11. A method of operating a gas lift elevator comprising a lower pebble engaging chamber and an upper disengaging chamber, said chambers being connected by a substantially upright gas lift conduit, which comprises supplying pebbles to said engaging chamber; passing a stream of lift gas into the lower portion of said engaging chamber; entrapping pebbles in said stream of lift gas, thereby raising said pebbles to said disengaging chamber; detecting the impingement of pebbles against the upper end of said disengaging chamber; and decreasing the supply of lift gas to said engaging chamber until said pebbles no longer impinge against the upper end of said disengaging chamber.

References Cited in the file of this patent

UNITED STATES PATENTS

| | | |
|---|---|---|
| 2,235,928 | Hardinge | Mar. 25, 1941 |
| 2,561,763 | Waters et al. | July 24, 1951 |
| 2,643,216 | Findlay | June 23, 1953 |
| 2,659,881 | Bogot et al. | Nov. 17, 1953 |
| 2,668,365 | Hogin | Feb. 9, 1954 |
| 2,684,124 | Hines | July 20, 1954 |
| 2,698,929 | Greacen et al. | Jan. 4, 1955 |

UNITED STATES PATENT OFFICE
CERTIFICATE OF CORRECTION

October 7, 1958

Patent No. 2,855,268

Robert R. Goins et al.

It is hereby certified that error appears in the printed specification of the above numbered patent requiring correction and that the said Letters Patent should read as corrected below.

Column 5, line 10, for "ffluent" read -- effluent --; line 36, for "Louid" read -- Loud --; column 8, line 20, strike out "means"; line 66, for the claim reference numeral "4" read -- 3 --.

Signed and sealed this 21st day of July 1959.

(SEAL)
Attest:
KARL H. AXLINE
Attesting Officer

ROBERT C. WATSON
Commissioner of Patents